May 25, 1954
O. MUELLER
2,679,377
VALVE FOR CROSS-CONNECTING POWER
PLANTS TO HYDRAULIC MACHINES
Filed Aug. 12, 1948
3 Sheets-Sheet 1
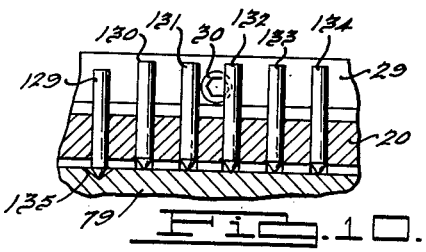
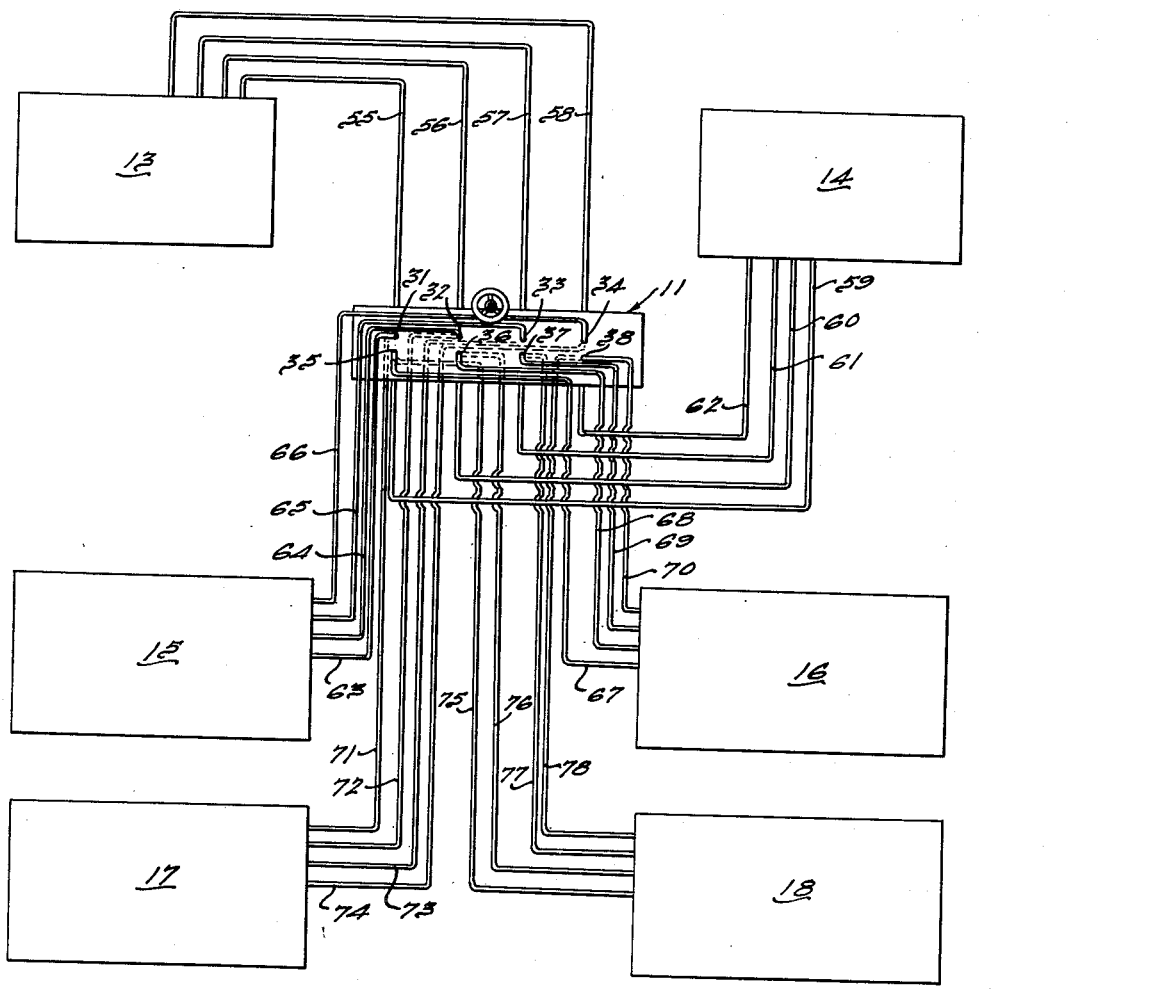
INVENTOR.
Otto Mueller.
BY
Harness, Dickey & Pierce.
ATTORNEYS.

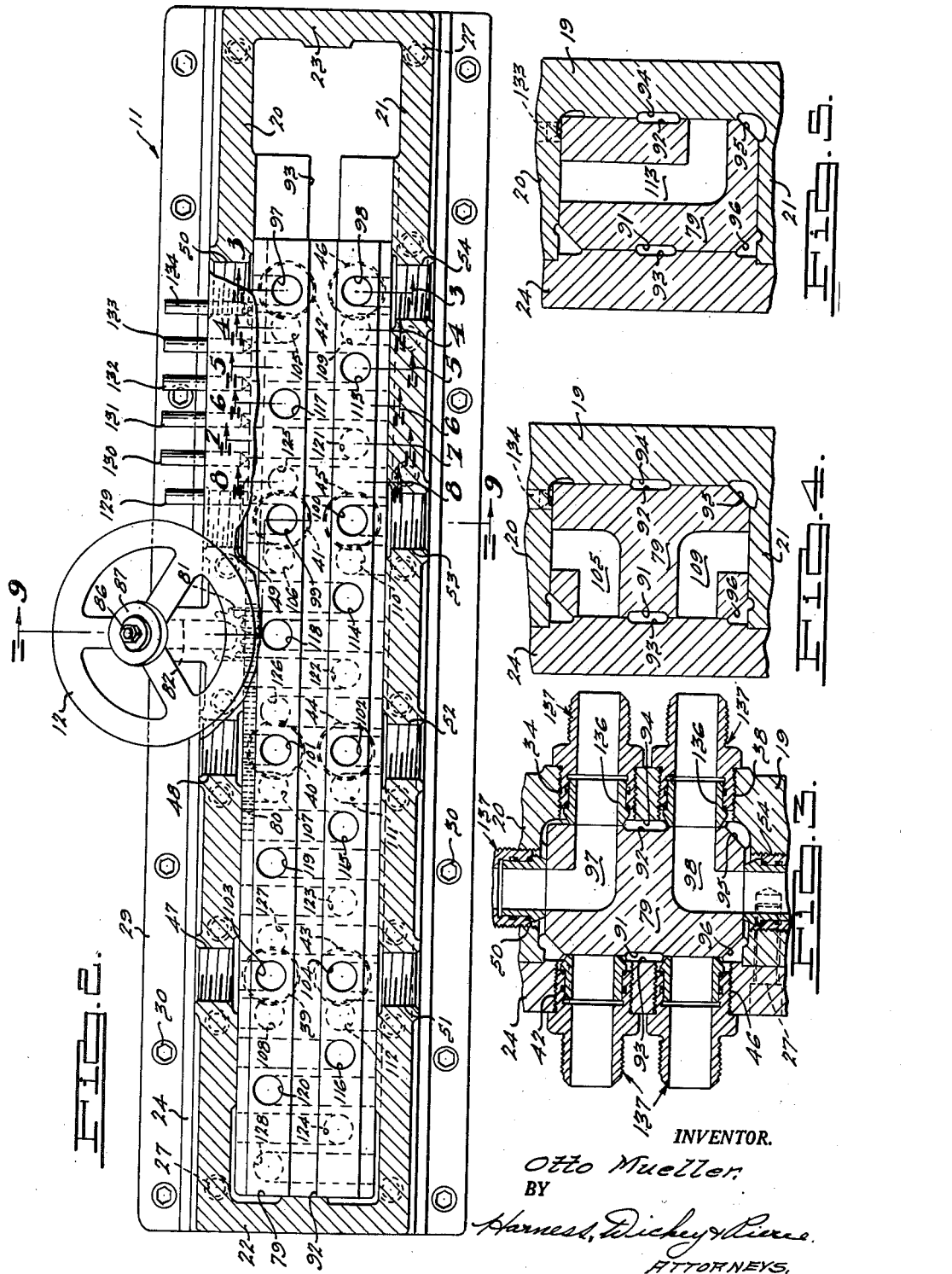

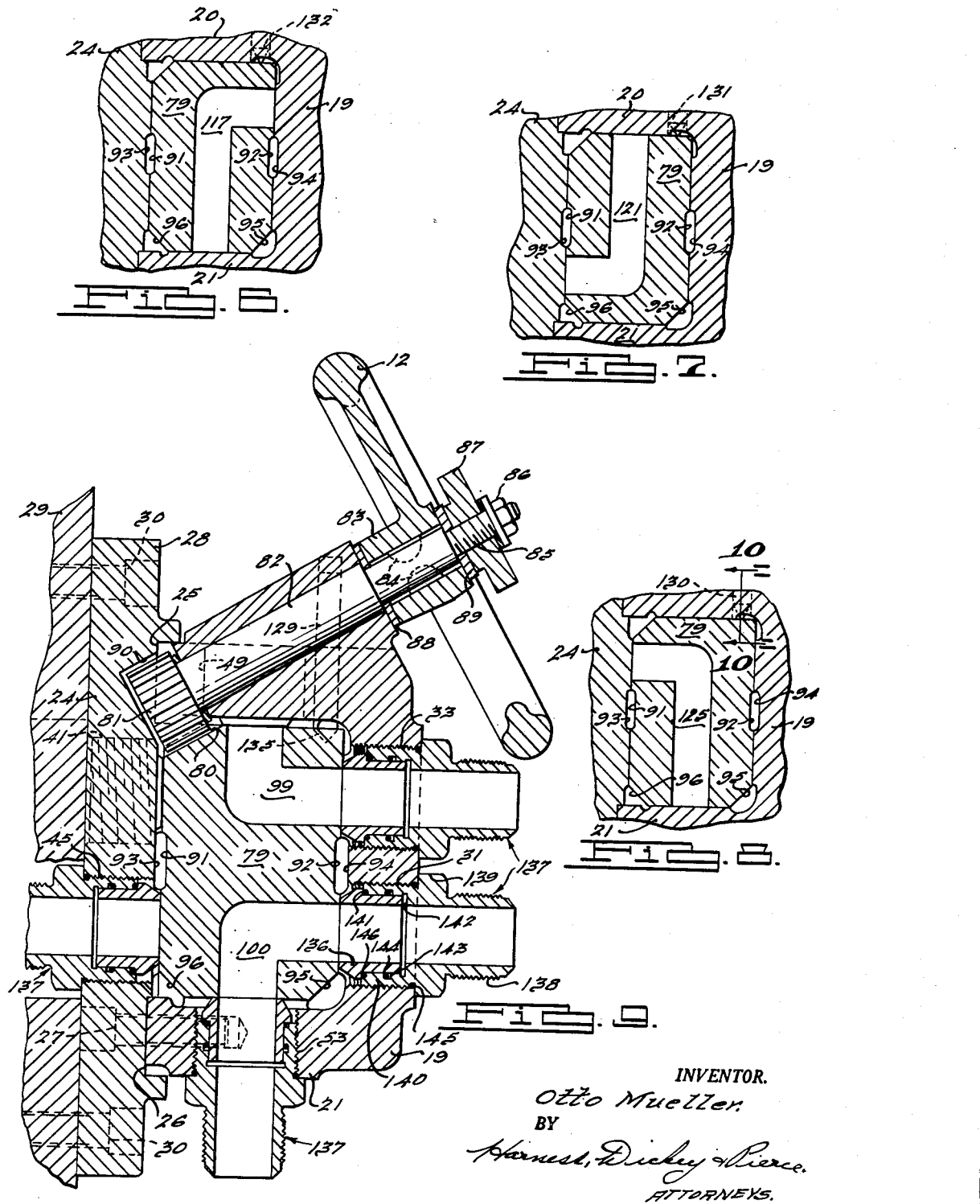

Patented May 25, 1954

2,679,377

UNITED STATES PATENT OFFICE 2,679,377

VALVE FOR CROSS-CONNECTING POWER PLANTS TO HYDRAULIC MACHINES

Otto Mueller, Dearborn, Mich.

Application August 12, 1948, Serial No. 43,914

4 Claims. (Cl. 251—175)

This invention relates to valve mechanisms generally, and more particularly to a transfer type of valve adapted for use between a plurality of high pressure fluid sources and a plurality of machines to be operated thereby, either individually or in selective groups.

Transfer valves of the above character heretofore known for use between one or more high pressure fluid sources and two or more machines for connecting one or more of the pressure sources to one or more of the machines to operate the latter, all have the distinct disadvantage that it has been impossible to efficiently and desirably seal the valve against leakages at the various valve inlets and outlets thereof when high fluid pressures are to be ejected from only certain of the outlets at any particular time. This leakage problem naturally becomes greater as the size of the valve increases or the value of the pressures to be transferred by the valve increases and the present invention contemplates the provision of a novel transfer valve in which the foregoing leakage problem has been overcome, notwithstanding the size of the valve or the value of the working pressures being utilized.

An object of the present invention therefore is to provide a novel high pressure fluid transfer valve.

Another object of the invention is to provide a high pressure fluid transfer valve with novel means whereby in spite of the size of the valve or the value of the pressures being transferred thereby, the valve remains leakproof.

A further object is to provide a novel, simple and inexpensive transfer valve utilizing self-sealing valve seats whereby the valve is leakproof.

A still further object is to provide a novel transfer valve adapted to connect sources of high fluid pressure with one or more machines selectively or in groups wherein the transfer of pressures from one source to one machine or another is accomplished through a fractional turn of a readily accessible hand wheel.

Another object is to provide a transfer valve with novel sealing means whose efficiency increases with increasingly high pressures communicated to the valve.

A further object is to provide a novel high fluid pressure transfer valve having a plurality of working positions with indicating means which will indicate to an operator the particular position the valve occupies during any given interval of time.

The above and further objects and novel features of the invention will more fully appear from the following detailed description, when the same is read in connection with the accompanying drawings. It is to be expressly understood, however, that the drawings are for purposes of illustration only and are not intended as a definition of the limits of the invention.

In the drawings wherein like reference characters refer to like parts throughout the several views:

Figure 1 is a diagrammatic illustration of the novel transfer valve of the present invention shown in association with two sources of high fluid pressure and four separate machines adapted for connection through the valve with the pressure sources;

Fig. 2 is an enlarged view in section of the novel transfer valve hereof;

Fig. 3 is a section view taken substantially along line 3—3 of Fig. 2;

Fig. 4 is a section view taken substantially along line 4—4 of Fig. 2;

Fig. 5 is a section view taken substantially along line 5—5 of Fig. 2;

Fig. 6 is a section view taken substantially along line 6—6 of Fig. 2;

Fig. 7 is a section view taken substantially along line 7—7 of Fig. 2;

Fig. 8 is a section view taken substantially along line 8—8 of Fig. 2;

Fig. 9 is a section view taken substantially along line 9—9 of Fig. 2; and

Fig. 10 is a section view taken substantially along line 10—10 of Fig. 8.

Referring now to the drawings for a more detailed description of the present invention and more particularly to Fig. 1 thereof, the novel transfer valve hereof, generally designated with the reference character 11, is illustrated as having a manually operable hand wheel 12 adapted for connecting selectively or simultaneously two separate sources 13 and 14 of high pressure fluid to one or more of remotely located fluid pressure operated machines 15, 16, 17 and 18.

As better shown in Figs. 2 and 9, the novel transfer valve 11 of the present invention, comprises a hollow valve casing having a closed front wall 19 together with top and bottom walls 20, 21, and end walls 22 and 23. The open end of the casing is closed by a rear wall 24, the wall being provided with shouldered recesses 25 and 26 which are in intimate contact with the outer edges of the top and bottom walls 20 and 21 of the casing, the casing being fastened to wall 24 by suitable means such as bolts 27, for example. The top and bottom ends of wall 24 are further formed with a reduced flanged portion 28 so that the transfer valve may be secured to a mounting plate 29 by way of a series of spaced bolts 30.

The closed front wall 19 of the valve casing is provided with two sets of spaced threaded outlet apertures or ports 31, 32, 33, 34, and 35, 36, 37, 38, each aperture or port communicating the outside of the casing with the inside thereof. As will be observed in Fig. 1, one set of ports 31, 32, 33 and 34 is directly above and spaced from the other set of ports 35, 36, 37 and 38, for a purpose to presently appear. Rear wall 24 of the valve casing in a similar manner is provided with four spaced threaded apertures or outlet ports 39, 40, 41 and 42 (Fig. 2) aligned with ports 31, 32, 33 and 34 of front wall 19 and four spaced lower threaded apertures or outlet ports 43, 44, 45 and 46 aligned with outlet ports 35, 36, 37 and 38 of front wall 19.

The valve casing is further provided in its top wall 20 with four equally spaced and threaded inlet apertures or ports 47, 48, 49 and 50 (Fig. 2) and at its bottom wall with four threaded inlet apertures or ports 51, 52, 53 and 54, each of which is aligned with the inlet ports of the top wall, all of the apertures or ports communicating the outside of the valve casing with the inside thereof. As will more fully appear hereinafter, inlet apertures or ports 47, 48, 49 and 50 communicate through novel fluid couplings or fittings, to be presently described, with high pressure fluid source 13 by way of conduits 55, 56, 57 and 58, respectively (Fig. 1), while inlet ports 51, 52, 53 and 54 communicate through similar fittings with high pressure fluid source 14 by way of conduits 59, 60, 61 and 62.

Machines 15, 16, 17 and 18 are arranged so that for a given position of the transfer valve, machine 15 will be connected for operation by pressure fluid from source 13 and machine 16 will be connected for operation by pressure fluid from source 14, machines 17 and 18 at this time being closed off from the sources of fluid pressure. For a second position of the valve, machine 17 will be connected for operation by fluid pressure from source 13 and machine 18 will be operated by fluid pressure from source 14, machines 15 and 16 being closed off from the pressure sources at this time. For a third position of the valve, machine 16 will be connected for operation by source 13 with the remaining machines being closed off at this time, while for a fourth position of the valve, machine 15 will be connected to pressure source 14 for operation thereby, at which time the remaining machines will be closed off from both pressure sources. For a further or fifth position of the valve, machine 18 will be connected to pressure source 13, while for a sixth position of the valve, machine 17 will be connected to pressure source 14. To this end, therefore, machine 15 is connected by way of conduits 63, 64, 65 and 66 to valve outlet ports 31, 32, 33 and 34 through a novel fitting to be presently described similar to the fitting utilized between the inlet ports and the pressure fluid sources. In a similar manner, machine 16 is connected with valve outlet ports 35, 36, 37 and 38 by way of conduits 67, 68, 69, and 70 while machine 17 is connected with outlet ports 39, 40, 41 and 42 by way of conduits 71, 72, 73 and 74 and machine 18 is connected by way of conduits 75, 76, 77 and 78 with outlet ports 43, 44, 45 and 46.

It will be apparent that with the above arrangement machine 15 may be connected for operation by pressure fluid source 13 and machine 16 may be connected for operation by pressure fluid source 14 at the same time, or machines 17 and 18 may be each connected for operation by sources 13 and 14, respectively. In the event of pressure failure of source 14, machines 16 or 18 may be selectively connected for operation by source 13, while in the event of pressure failure of source 13, machines 15 and 17 may be connected for selective operation by source 14.

In addition to the above described parts, the transfer valve also includes an elongated valve member 79 mounted for axial sliding motion in one direction or another, within the valve casing, such sliding motion being determined by manual operation of hand wheel 12. To this end an upper edge of the valve member is beveled and provided with a toothed portion to thereby define a toothed rack 80 which is in meshing engagement with a gear 81 carried by a shaft 82. The latter shaft, as better shown in Fig. 9, extends out of the valve casing and at its extended end has the hub 83 of hand wheel 12 secured thereto by way of keys 84. The outermost end of the shaft carries a reduced threaded portion 85 which is provided with a nut 86 for maintaining the hand wheel on the shaft through the agency of a retainer disk or element 87. If desired, bearing washers 88, 89 may be provided to surround the shaft at either end of hub 83. Movement of hand wheel 12, therefore, in one direction or another, will impart sliding motion in one direction or another to valve member 79, rear wall 24 being provided with a cutout or notched portion 90 to accommodate gear 81 therein. In order to minimize frictional engagement between the outer walls of the valve member 79 and the inner walls of the valve casing, the valve member is provided with channeled portions 91 and 92 at either end thereof, with corresponding channeled portions 93 and 94, located on the inner side of rear wall 24 and on the inner side of front wall 19, respectively. For the same purpose the lower edges of the valve member are beveled as shown at 95 and 96.

In order that the various above described connections may be made between high fluid pressure sources 13 and 14 and machines 15, 16, 17 and 18, valve member 79 is provided with pairs of right-angled channels or bores 97—98, 99—100, 101—102, and 103—104. In the first position of the novel transfer valve hereof in which pressure source 13 is connected to machine 15 and pressure source 14 is connected to machine 16, one end of the bore 97 registers with inlet port 58 (Fig. 3) and the other end of the bore registers with outlet port 34 so that fluid pressure from source 13 is communicated to machine 15 from source 13 by way of conduit 66, while one end of bore 98 registers with inlet port 54 and the other end thereof registers with outlet port 38 so that fluid pressure from source 14 is communicated to machine 16 by way of conduit 70. At the same time, like ends of bores 99, 101 and 103 register with inlet ports 49, 48 and 47 and the opposite ends thereof register with outlet ports 33, 32 and 31 so that fluid pressure from source 13 is also connected to machine 15 by way of conduits 65, 64 and 63, while like ends of bores 100, 102 and 104 register with inlet ports 53, 52 and 51 and the opposite ends thereof register with outlet ports 37, 36 and 35 whereby fluid under pressure from source 14 is also communicated to machine 16 by way of conduits 69, 68 and 67.

Formed to the left of each right-angled bore 97, 99, 101 and 103 in valve member 79 are reversely arranged right-angled bores 105 (Fig. 4), 106, 107 and 108 and formed to the left of right-angled bores 98, 100, 102 and 104 are reversely arranged right-angled bores 109, 110, 111 and 112. In all positions of the transfer valve except the second, bores 105–112, inclusive, are closed off. In the second position on the valve, however, like ends of bores 105, 106, 107 and 108 are brought into registry with inlet ports 50, 49, 48 and 47 and the opposite ends thereof are brought into registry with outlet ports 42, 41, 40 and 39 whereby fluid pressure from source 13 is communicated to machine 17 by way of conduits 74, 73, 72 and 71. At the same time, like ends of bores 109, 110, 111 and 112 are brought into registry with inlet ports 54, 53, 52 and 51 and the opposite ends thereof are brought into registry with outlet ports 46, 45, 44 and 43 whereby fluid pressure is communicated from source 14 to machine 18 by way of conduits 78, 77, 76 and 75.

Formed in valve member 79 to the left of each of bores 105—112, inclusive, are single right-angled bores 113 (Fig. 5), 114, 115 and 116. These latter bores in all positions of the transfer valve except the third are closed off but when the valve is operated to its third position like ends of bores 113, 114, 115 and 116 are brought into registry with inlet ports 50, 49, 48 and 47 and the opposite ends thereof are brought into registry with outlet ports 38, 37, 36 and 35 whereby pressure fluid from source 13 is communicated to machine 16 by way of conduits 70, 69, 68 and 67. In the latter position of the valve, machines 15, 17 and 18 will be closed off from both pressure sources.

Also formed on valve member 79 to the left of single bores 113, 114, 115 and 116 are reversely arranged single right-angled bores 117, 118, 119 and 120. The latter bores in all positions of the transfer valve except the fourth are closed off but when the valve is operated to its fourth position like ends thereof are brought into registry with inlet ports 54, 53, 52 and 51 and the opposite ends thereof are brought into registry with outlet ports 34, 33, 32 and 31 whereby pressure fluid from source 14 is communicated to machine 15 by way of conduits 66, 65, 64 and 63. In this latter position of the valve, machines 16, 17 and 18 will be closed off from both pressure sources.

Valve member 79, furthermore, is provided to the left of right-angled bores 117, 118, 119 and 120 with other single right-angled bores 121 (Fig. 7), 122, 123 and 124. These latter bores in all positions of the transfer valve except the fifth are closed off but when the valve is operated to its fifth position, like ends of the bores are brought into registry with inlet ports 50, 49, 48 and 47 and the opposite ends thereof are brought into registry with outlet ports 46, 45, 44 and 43 whereby pressure fluid from source 13 is communicated to machine 18 by way of conduits 78, 77, 76 and 75. In this position of the valve machines 15, 16 and 17 will be closed off from both pressure sources.

In addition to the various above discussed bores, valve member 79 is also provided to the left of right-angled bores 121, 122, 123 and 124 with reversely arranged single right-angled bores 125 (Fig. 8), 126, 127 and 128. These latter bores in all positions of the transfer valve except the sixth are closed off but when the valve is operated to its sixth position, like ends of the bores are brought into registry with inlet ports 54, 53, 52 and 51 and the opposite ends thereof are brought into registry with outlet ports 42, 41, 40 and 39 whereby pressure fluid from source 14 is connected to machine 17 by way of conduits 74, 73, 72 and 71. In this position of the valve, machines 15, 16 and 18 are closed off from both pressure sources.

In order that the operator may be instantly advised as to the particular position that the transfer valve occupies at any given time novel means are provided in the form of spaced pins 129, 130, 131, 132, 133 and 134 (Figs. 2 and 10), each pin representing a definite position of the valve. The pins are received within receptive holes formed in top wall 20 of the valve casing and their lower ends are tapered for selective cooperation with a notch 135 formed on valve member 79. As the tapered end of any one of the pins is brought into registry with notch 135 the pin drops inwardly relative to the remaining pins so that its top portion assumes a position in a plane below and parallel to the plane containing the top ends of the other pins, exhibiting to the operator the instantaneous position of the valve. In Fig. 2 of the drawings, pin 129 is shown as having dropped into notch 135, representing the first position of the valve in which inlet ports 47, 48, 49 and 50 have been brought into registry with outlet ports 31, 32, 33 and 34 to connect source 13 to machine 15 and in which inlet ports 51, 52, 53, and 54 have been brought into registry with outlet ports 35, 36, 37 and 38 to connect source 14 with machine 16.

Where it is desired to operate the transfer valve to its second position, hand wheel 12 is turned in a counterclockwise direction a fraction of a turn causing movement to the right (Fig. 2) of valve member 79. As a result of such motion pin 129 is cammed out of notch 135 and the notch is brought into registry with the lower end of pin 130 which drops into the notch advising the operator that the second valve position has been established in which pressure sources 13 and 14 are cut off from machine 15 and 16 and in which inlet ports 47, 48, 49 and 50 and inlet ports 51, 52, 53 and 54 have been brought into registry with outlet ports 39, 40, 41 and 42 and outlet ports 43, 44, and 45 and 46, respectively, so that pressure source 13 is connected to machine 17 and pressure source 14 is connected to machine 18. For progressive positions of the valve the hand wheel is turned until pins 131, 132, 133 and 134 selectively register with notch 135 indicating a third, fourth, fifth and sixth position of the valve. With pin 131 in registry with notch 135 the operator is advised that appropriate inlet ports have been brought into registry with appropriate outlet ports to connect pressure source 13 with machine 16, while with pin 132 in registry with the notch 135, the operator is advised that appropriate inlet ports have been brought into registry with appropriate outlet ports to connect pressure source 14 with machine 15 and with pin 133 in registry with the notch, the operator is advised that source 13 has been connected to machine 18. As pin 134 is brought into registry with the notch the operator is advised that source 14 has been connected to machine 17.

In accordance with a further feature of the present invention novel self-sealing valve seats are provided at the various inlets and outlets so that a desirable leak-proof transfer valve is provided thereby. As better shown in Fig. 9 of the drawings each of the threaded ports receives a hollow self-sealing valve seat member 136 therein whose one end is tapered and in engagement with valve member 79 to register with the various related bores formed in the valve member. Surrounding the valve seat member for bringing the latter into engagement with valve member 79 is a hollow fluid coupling or connector, generally designated with the reference character 137, which has a reduced exteriorly threaded portion 138, an intermediate nut portion 139 and a reduced externally threaded portion 140. When the connector is assembled with the valve within its related port, the inner face of the nut portion 139 will engage with one of the walls of the valve casing. The innermost end of the coupling engages with a shoulder 141 formed on valve seat 136 and the coupling is provided with a groove 142 at its inner periphery so that pressure fluid flowing through the hollow valve seat and the connector will act on the inner face of the valve seat to urge the latter into engagement with a wall of valve member 79. The threads in the apertures or ports and those on the coupling may be straight threads as distinguished from the conventional pipe threads and the connector is formed with an internal slot or receptive chamber 143 which receives an O-ring 144 thus preventing passage of pressure fluid between the outer periphery of the valve seat member and the connector. If desired, a second O-ring 145 may be utilized between nut 139 and one of the walls of the valve casing to provide a final seal. In addition, a third O-ring 146 of "neoprene" or other yieldable material is inserted between shoulder 141 of the valve seat and the connector which assists in the sealing characteristics of the valve seat. Inasmuch as fluid pressure is adapted to act on the inner edge of the valve seat within the pressure chamber defined by groove 142, the self-sealing characteristics of the valve seat are improved as the value of the pressure fluid utilized is increased. Thus a novel and desirable self-sealing leak-proof valve has been provided hereby.

It will now be apparent to those skilled in the art that a novel and simple transfer valve has been provided by the present invention in which by a fractional turn of a single hand wheel various pressure fluid operated machines may be connected to one or more pressure fluid source, the valve being self-sealing and therefore leak-proof.

Although but a single embodiment of the present invention has been illustrated and described in detail, it is to be expressly understood that the invention is not limited thereto. Various changes may be made in the description and arrangement of the parts without departing from the spirit and scope of the invention.

What is claimed is:

1. A sealing device for joining aligned passageways between two elements, the passageway in one of said elements embodying an enlarged threaded aperture, said device including, in combination, an externally threaded connector securable in said threaded aperture, said connector having an enlarged aperture parallel to said threaded portion, a sleeve in said last enlarged aperture having a passageway substantially of the size of the passageway in said other element in alignment therewith, a sealing ring between the sleeve and the wall of the said last enlarged aperture, a head on the end of the sleeve forming a shoulder engageable with the end of the connector, said head having a flat end face, said head tapering toward the flat end face to reduce the flat end face area thereof, said flat end face area of the sleeve and the flat area about the passageway in the other element being planar and provided with a fine finish to form a face-to-face seal for preventing the leakage of a liquid delivered through said passageways.

2. A sealing device for joining aligned passageways between two elements, the passageway in one of said elements embodying an enlarged threaded aperture, said device including, in combination, an externally threaded connector securable in said threaded aperture, said connector having an enlarged aperture parallel to said threaded portion, a sleeve in said last enlarged aperture having a passageway substantially of the size of the passageway in said other element in alignment therewith, a sealing ring between the sleeve and the wall of the said last enlarged aperture, a head on the end of the sleeve forming a shoulder engageable with the end of the connector, said head having a flat end face, said head tapering toward the flat end face to reduce the flat end face area thereof, said flat end face area of the sleeve and the flat area about the passageway in the other element being planar and provided with a fine finish to form a face-to-face seal for preventing the leakage of a liquid delivered through said passageways, the opposite end of the sleeve from that having the head being spaced from the adjacent portion of the connector so as to be subject to the pressure of the liquid within the passageway to increase the sealing force applied to said abutting flat areas of the sleeve and other element as the pressure on the fluid increases.

3. A sealing device for joining aligned passageways between two elements, the passageway in one of said elements embodying an enlarged threaded aperture, said device including, in combination, an externally threaded connector securable in said threaded aperture, a sleeve in said connector, a sealing ring between the sleeve and the wall of said connector, a head on the end of the sleeve forming a shoulder engageable with the end of the connector, said head having a flat end face, said head tapering toward the flat end face to reduce the flat end face area thereof, said flat end face area of the sleeve and the flat area about the passageway in the other element being planar and provided with a fine finish to form a face-to-face seal for preventing the leakage of a liquid delivered through said passageways, the opposite end of the sleeve from that having the head being subject to the pressure of the liquid within the passageway to increase the sealing force applied to said abutting flat areas of the sleeve and other element as the pressure on the fluid increases, and a resilient sealing ring between said head and the adjacent end of the connector for initially applying a sealing force between the flat areas of the end face and the other element.

4. A sealing device for joining aligned passageways between two elements, the passageway in one of said elements embodying an enlarged threaded aperture, said device including, in combination, an externally threaded connector securable in said threaded aperture, a sleeve in said connector, a sealing ring between the sleeve and the wall of said connector, a head on the end of the sleeve forming a shoulder engageable with the end of the connector, said head having a flat end face, said head tapering toward the flat end face to reduce the flat end face area thereof, said flat end face area of the sleeve and the flat area about the passageway in the other element being planar and provided with a fine finish to form a face-to-face seal for preventing the leakage of a liquid delivered through said passageways, the opposite end of the sleeve from that having the head being subject to the pressure of the liquid within the passageway to increase the sealing force applied to said abutting flat areas of the sleeve and other element as the pressure on the fluid increases, and a resilient sealing ring between said head and the adjacent end of the connector for initially applying a sealing force between the flat areas of the end face and the other element, said flat area of the other element being extended at one side thereof a distance at least equal to the diameter of the flat end face area, said elements being so related that one may be shifted laterally relative to the other so that the passage of fluid through the passageways may be interrupted and the fluid in the passageway which includes the sealing device is sealed against leakage through the engagement of the flat end face area of the sleeve with said extended flat area of the other element.

References Cited in the file of this patent

UNITED STATES PATENTS

| Number | Name | Date |
|---|---|---|
| 649,028 | Wren | May 8, 1900 |
| 1,770,900 | Dawson | July 22, 1930 |
| 2,049,805 | Heinen | Aug. 4, 1936 |
| 2,291,563 | Rotter | July 28, 1942 |
| 2,335,814 | Stevenson | Nov. 30, 1943 |
| 2,397,736 | Hadekel | Apr. 2, 1946 |
| 2,445,781 | Hrdlicka | July 27, 1948 |